J. L. HEYMANN.
SPRING WHEEL.
APPLICATION FILED JULY 29, 1913.
1,123,875.
Patented Jan. 5, 1915.
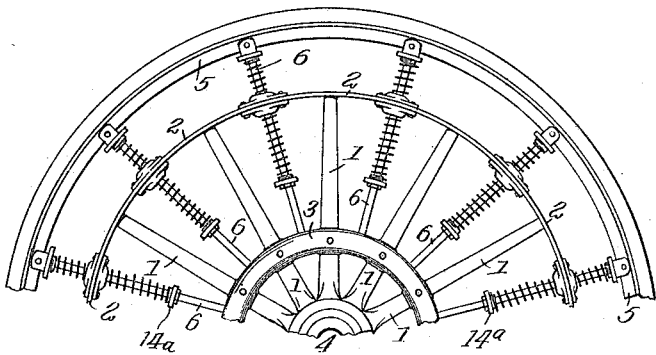
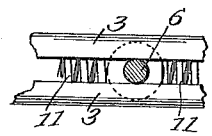
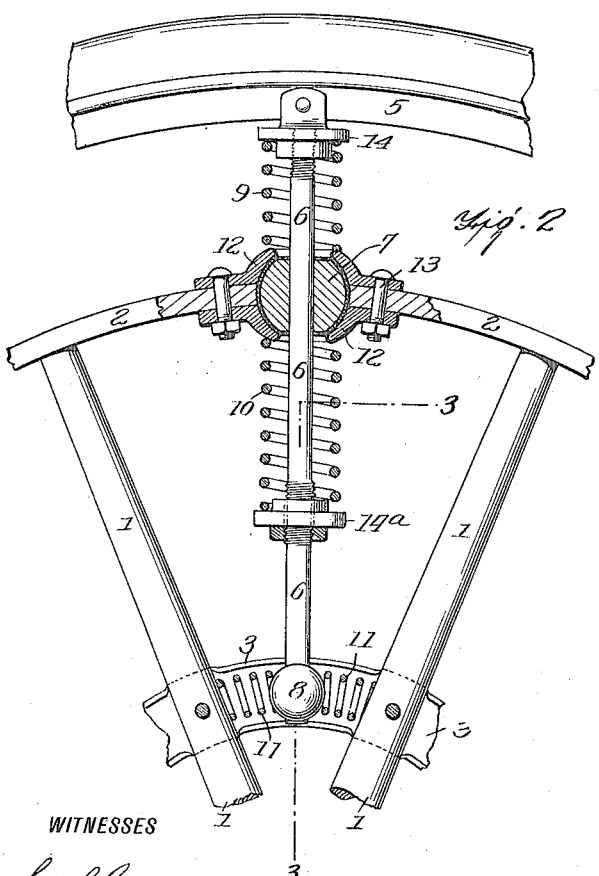
WITNESSES
INVENTOR
JOSEPH L. HEYMANN,
BY Munn & Co.
ATTORNEYS

UNITED STATES PATENT OFFICE.

JOSEPH LEE HEYMANN, OF FAYETTEVILLE, TENNESSEE.

SPRING-WHEEL.

1,123,875.

Specification of Letters Patent.

Patented Jan. 5, 1915.

Application filed July 29, 1913. Serial No. 781,796.

*To all whom it may concern:*

Be it known that I, JOSEPH L. HEYMANN, a citizen of the United States, and a resident of Fayetteville, in the county of Lincoln and State of Tennessee, have invented an Improvement in Spring-Wheels, of which the following is a specification.

The invention is an improvement in that class or type of vehicle wheels, more particularly such as are used on automobiles, in which a spring-supported and yieldable rim or tread surrounds, and is spaced concentrically from, a rigid inner frame, or wheel.

The improvement is embodied in the combination and arrangement of parts hereinafter described and claimed, whereby the tread or rim is adapted to yield radially and circumferentially, but prevented from lateral deflection.

In the accompanying drawing, Figure 1 is a side view of a portion of the wheel. Fig. 2 is in part a section and in part a side view. Fig. 3 is a section on the line 3—3 of Fig. 2. Fig. 4 is a cross section on the line 4—4 of Fig. 3.

The circular, rigid, inner frame of the wheel is formed of radial spokes 1, a circular rim 2 connecting their outer ends, and a slotted metal tube 3, which is attached to the said spokes adjacent to the hub 4. The concentric outer tread rim 5 is spaced from the fixed rim 2, and in practice is provided with an elastic tread. The slidable spokes 6 are in the form of round rods which are jointed to the tread rim 5 and extend through the rocking spherical bearings 7 and 8. The larger outer bearings 7 are held in a socket formed of duplicate parts 12 which are secured to the fixed rim 2 by means of screw-bolts 13.

In practice, the rim 2 may be made in arc sections, and the rocking spherical bearings 7 will be arranged between their adjacent ends which the metal sockets 12 serve to connect rigidly. The smaller spherical bearings 8 are held in a circular guide 3 formed of tube sections arranged opposite each other, on opposite sides of the spokes 1, and separated by a slot which permits the spokes 6 to pass through and also to swing between adjacent fixed spokes in the plane of the wheel. The spiral springs 11 are arranged in the tubular guide 3 thus formed and on opposite sides of the spherical bearings 8. The outer springs 9 encircle the outer portions of the slidable spokes 6, being arranged between the ball sockets 12 and a disk nut 14 applied to the outer threaded portions of the spokes. The inner springs 10 are applied to the middle portions of the slidable spokes 6 between the ball sockets 12 and a disk nut $14^a$ which is applied to a threaded portion of the spokes, as shown in Figs. 2 and 3. It is apparent that, by rotation of the nuts 14 and $14^a$, the tension of the springs 9 and 10 may be changed at will.

In respect to the operation of the wheel, it will now be understood that whatever load or weight is imposed on the wheel, its outer or tread rim 5 will yield radially, or be compressed inward toward the fixed rim 2, to a corresponding degree. In other words, the under side of the wheel will be compressed or moved inward toward the fixed rim, and the outer springs 9 compressed to a corresponding degree, while the springs 10, which are diametrically opposite on the upper side of the wheel, will also be compressed. Thus both sets of outer and inner springs 9 and 10, which are diametrically opposite each other, will be simultaneously brought into action and compressed correspondingly to the load.

It will be seen that the tread rim 5 is prevented from lateral deflection or held constantly in the plane of the inner wheel by reason of the two bearings 7 and 8 provided for the slidable spokes 6; and it is further apparent that the rocking spherical bearings 7 and the bearings 8 which are movable in the tubular guides 3 permit the spokes 6 to move or oscillate in the plane of the wheel, which movement will occur as the elastic rim passes over a roadway. If the roadway be very smooth and the load light, the deflection or inclination of the spokes 6 in the plane of the wheel will be slight; but if the rim meets considerable obstruction, the spokes 6 will be deflected to a corresponding degree, or so far as permitted by the compression of the springs 11.

I claim:—

A spring wheel comprising an inner rigid frame including rigid radial spokes, an outer concentric elastic tread rim and radial slidable spokes attached to such rim, rocking guides for said spokes which are held in the inner rigid frame applied to the ends of the spokes, slotted guides arranged between the spokes, spherical bearings arranged in such slotted guides and through which the slidable spokes pass and spiral springs applied to the spokes exteriorly and interiorally of the fixed rim, and other spiral springs arranged in the slotted guides in contact with the inner bearings of the slidable spokes, thereby elastically resisting the movement of the same in the plane of the wheel.

JOSEPH LEE HEYMANN.

Witnesses:
A. D. HARBIN,
A. L. SLOAN.